US 8,797,826 B2

(12) United States Patent
Bagaini

(10) Patent No.: US 8,797,826 B2
(45) Date of Patent: Aug. 5, 2014

(54) SEISMIC VIBRATORY ACQUISITION METHOD AND APPARATUS

(75) Inventor: Claudio Bagaini, Cottenham (GB)

(73) Assignee: WesternGeco L.L.C., Houston, TX (US)

(*) Notice: Subject to any disclaimer, the term of this patent is extended or adjusted under 35 U.S.C. 154(b) by 831 days.

(21) Appl. No.: 12/600,493

(22) PCT Filed: Jul. 11, 2008

(86) PCT No.: PCT/GB2008/002373
§ 371 (c)(1),
(2), (4) Date: Apr. 27, 2010

(87) PCT Pub. No.: WO2009/019423
PCT Pub. Date: Feb. 12, 2009

(65) Prior Publication Data
US 2010/0199772 A1 Aug. 12, 2010

(30) Foreign Application Priority Data
Aug. 4, 2007 (GB) .................... 0715221.8

(51) Int. Cl.
*G01V 1/00* (2006.01)
(52) U.S. Cl.
USPC .............................. 367/37; 73/648
(58) Field of Classification Search
USPC ........ 181/111, 112, 108, 113; 367/15, 20, 23, 367/40, 41, 43, 49, 38, 75, 190, 37; 702/14; 73/648
See application file for complete search history.

(56) References Cited

U.S. PATENT DOCUMENTS

| | | | |
|---|---|---|---|
| 3,815,704 A | 6/1974 | Eisner | |
| 3,885,225 A | 5/1975 | Anstey et al. | |
| 3,895,343 A | 7/1975 | Farr | |
| 4,004,267 A | 1/1977 | Mayne | |
| 4,168,485 A | 9/1979 | Payton et al. | |
| 4,201,972 A | 5/1980 | Edwards et al. | |
| 4,222,455 A | 9/1980 | Lerwill | |
| 4,295,213 A * | 10/1981 | Mifsud | 367/41 |
| 4,519,053 A | 5/1985 | Bedenbender et al. | |
| 4,750,157 A | 6/1988 | Shei | |
| 4,823,326 A | 4/1989 | Ward | |
| 4,926,392 A * | 5/1990 | Handley et al. | 367/59 |
| 4,953,657 A | 9/1990 | Edington | |

(Continued)

FOREIGN PATENT DOCUMENTS

| | | |
|---|---|---|
| CA | 2316665 A1 | 3/2001 |
| GB | 2306219 | 4/1997 |

(Continued)

OTHER PUBLICATIONS

Lerwill, "The amplitude and phase response of a seismic vibrator," Geophysical Prospecting, 29, 503-528, 1981.*

(Continued)

*Primary Examiner* — Isam Alsomiri
*Assistant Examiner* — Daniel L Murphy

(57) ABSTRACT

A method and related apparatus are described for generating acoustic signals for use in a vibratory seismic survey, including at least two different sweep signals for the control of at least two different types of vibrators; and matching the phases of the different sweep signals at a transition frequency from one sweep signal to another.

11 Claims, 10 Drawing Sheets

(56) References Cited

U.S. PATENT DOCUMENTS

| | | | |
|---|---|---|---|
| 4,982,374 A | 1/1991 | Edington et al. | |
| 5,410,517 A * | 4/1995 | Andersen | 367/75 |
| 5,550,786 A | 8/1996 | Allen | |
| 5,719,821 A | 2/1998 | Sallas et al. | |
| 5,721,710 A | 2/1998 | Sallas et al. | |
| 6,028,818 A * | 2/2000 | Jeffryes | 367/20 |
| 6,035,257 A | 3/2000 | Epperson | |
| 6,152,256 A | 11/2000 | Favret et al. | |
| 6,161,076 A | 12/2000 | Barr et al. | |
| 6,181,646 B1 | 1/2001 | Bouyoucos et al. | |
| 6,366,857 B1 | 4/2002 | Bird et al. | |
| 6,418,079 B1 * | 7/2002 | Fleure | 367/40 |
| 6,519,533 B1 | 2/2003 | Jeffryes | |
| 6,603,707 B1 | 8/2003 | Meunier et al. | |
| 6,704,245 B2 | 3/2004 | Becquey | |
| 6,754,590 B1 | 6/2004 | Moldoveanu | |
| 6,766,256 B2 | 7/2004 | Jeffryes | |
| 6,807,508 B2 | 10/2004 | Becquey | |
| 6,842,701 B2 | 1/2005 | Moerig et al. | |
| 6,942,059 B2 | 9/2005 | Smith | |
| 7,050,356 B2 | 5/2006 | Jeffryes | |
| 7,327,633 B2 | 2/2008 | Bagaini et al. | |
| 7,330,401 B2 | 2/2008 | Jeffryes et al. | |
| 7,376,046 B2 | 5/2008 | Jeffryes | |
| 7,602,670 B2 | 10/2009 | Jeffryes | |
| 7,672,194 B2 | 3/2010 | Jeffryes | |
| 2002/0067659 A1 | 6/2002 | Becquey | |
| 2002/0091487 A1 | 7/2002 | Moerig et al. | |
| 2003/0163260 A1 | 8/2003 | Moerig et al. | |
| 2003/0210609 A1 | 11/2003 | Jeffryes | |
| 2006/0018192 A1 | 1/2006 | Jeffryes et al. | |
| 2006/0158962 A1 | 7/2006 | Jeffryes | |
| 2006/0250891 A1 | 11/2006 | Krohn | |
| 2007/0091721 A1 | 4/2007 | Jeffryes | |
| 2007/0133354 A1 | 6/2007 | Bagaini et al. | |

FOREIGN PATENT DOCUMENTS

| | | | |
|---|---|---|---|
| GB | 2359363 A | | 8/2001 |
| GB | 2387226 A | | 10/2003 |
| GB | 2416033 A | * | 1/2006 |
| WO | 9853344 A1 | | 11/1998 |
| WO | 0057208 A1 | | 9/2000 |
| WO | 0072049 A1 | | 11/2000 |
| WO | 0161379 A2 | | 8/2001 |
| WO | 0233442 A2 | | 4/2002 |
| WO | 0233442 A3 | | 4/2002 |

OTHER PUBLICATIONS

Rietsch E., "Vibroseis Signals with Prescribed Power Spectrum," Geophysical Prospecting, Dec. 1977, vol. 25 (4): pp. 613-620.
Jeffryes B.P., "Far-Field Harmonic Measurement for Seismic Vibrators," Acquisition 3: Land Aquisition, Nov. 14, pp. 60-63, 1996.
Ras et al., "Harmonic Distortion in Slip Sweep Records," SEG (1999) Expanded Abstracts, 4 pages.
Rosemond, H. Justice, "Slip-Sweep Acquisition", ACQ 3.2, pp. 64-67, 1996.
Duyndam et al., "Marine Production levels in Land 3-D Seismic," The Leading Edge, 1999, vol. 18, No. 10, pp. 1170-1173.
International Search Report and Written Opinion issued in PCT/GB2008/002373 on Oct. 28, 2008, 13 pages.
Examination Report issued in GCC/P/2008/11428 on Dec. 17, 2012, 5 pages.
Combined Search and Examination Report issued in GB0715221.8 on Nov. 6, 2007, 6 pages.

* cited by examiner

SEISMIC VIBRATORY ACQUISITION METHOD AND APPARATUS

This invention relates to seismic surveying, and is more particularly concerned with the seismic surveying of earth formations using an acoustic source in the form of vibrators which impart a variable frequency signal into the earth formations, either directly in the case of surveying on land, or via water in the case of marine seismic surveying.

BACKGROUND OF THE INVENTION

In the oil and gas industry, geophysical prospecting techniques are commonly used to aid in the search for and evaluation of subterranean hydrocarbon deposits. Generally, a seismic energy source is used to generate a seismic signal that propagates into the earth and is at least partially reflected by subsurface seismic reflectors (i.e., interfaces between underground formations having different acoustic impedances). The reflections are recorded by seismic detectors located at or near the surface of the earth, in a body of water, or at known depths in boreholes, and the resulting seismic data may be processed to yield information relating to the location of the subsurface reflectors and the physical properties of the subsurface formations.

One type of geophysical prospecting utilizes an impulsive energy source, such as dynamite or a marine air gun, to generate the seismic signal. With an impulsive energy source, a large amount of energy is injected into the earth in a very short period of time. Accordingly, the resulting data generally have a relatively high signal-to-noise ratio, which facilitates subsequent data processing operations. On the other hand, use of an impulsive energy source can pose certain safety and environmental concerns.

Since the late 1950s and early 1960s, a new type of geophysical prospecting, generally known as "VIBROSEIS"® prospecting, has been used. Vibroseis prospecting employs a land or marine seismic vibrator as the energy source. In contrast to an impulsive energy source, a seismic vibrator imparts a signal into the earth having a much lower energy level, but for a considerably longer period of time.

The seismic signal generated by a seismic vibrator is a controlled wavetrain (i.e., a sweep) which is applied to the surface of the earth or in the body of water or in a borehole. In seismic surveying on land using a vibrator, to impart energy into the ground in a swept frequency signal, the energy is typically imparted by using a hydraulic drive system to vibrate a large weight (the reaction mass) up and down. The reaction mass is coupled to a baseplate, in contact with the earth and through which the vibrations are transmitted to the earth. The baseplate also supports a large fixed weight, known as the hold-down weight. Typically, a sweep is a sinusoidal vibration of continuously varying frequency, increasing or decreasing monotonically within a given frequency range, which is applied during a sweep period lasting from 2 to 20 seconds or even pore. The frequency may vary linearly or nonlinearly with time. Also, the frequency may begin low and increase with time in a so-called upsweep, or it may begin high and gradually decrease in a downsweep.

Vibrators for use in marine seismic surveying typically comprise a bell-shaped housing having a large and heavy diaphragm, equivalent to the aforementioned baseplate, in its open end. The vibrator is lowered into the water from a marine survey vessel, and the diaphragm is vibrated by a hydraulic drive system similar to that used in a land vibrator. Alternative marine vibrator designs comprise two solid curved or hemispherical shells, joined together by an elastic membrane. The hydraulic drive moves the two shells relative to one another in a similar manner to the movement of the reaction mass in a land vibrator.

The seismic data recorded during Vibroseis prospecting (hereinafter referred to as "vibrator data") are composite signals, each consisting of many long, reflected wavetrains superimposed upon one another. Since these composite signals are typically many times longer than the interval between reflections, it is not possible to distinguish individual reflections from the recorded signal. However, when the seismic vibrator data is cross-correlated with the sweep signal (also known as the "reference signal"), the resulting correlated data approximates the data that Would have been recorded if the source had been an impulsive energy source.

The amount of energy injected into the earth during a conventional vibrator sweep is governed by the size of the vibrator and the duration of the sweep. Emerging and beyond imaging applications of the seismic method such as acoustic impedance inversion and in general reservoir characterization and monitoring require signals with energetic low frequencies. On the receiver side, the growing use of accelerometers in surface and borehole seismic enables the acquisition at high signal to noise ratio of frequencies lower than 8-10 Hz. Low actuator forces are needed to shake the vibrators at these low frequencies (typically 4 to 8 Hz), which in turn can yield extremely long sweeps in absence of a design criterion or if a too conservative criterion is used.

There are several of constraints on the amplitude of the vibrations. The most basic of these is that the hold-down weight must exceed the maximum upward force, so that the vibrator never loses contact with the ground. However, there are other constraints on low frequency output. Since, as already mentioned, the ground force is generated by vibrating a large weight, and the force generated by the weight is equal to its mass times its acceleration, at low frequencies for the same generated ground force the peak velocities and displacements are higher than at high frequencies. Typically, the lowest frequency that can be produced by a vibrator at a fixed force level is determined by the maximum stroke length possible for the vibratory weight, and the amount of time that the vibrator can spend at low frequencies is determined by the amount of hydraulic fluid stored in accumulators at the start of the sweep time and the maximum flow capacity of the hydraulic system. Marine vibrators are therefore subject to operational constraints analogous to those of land vibrators.

U.S. Pat. No. 5,410,517 issued to Andersen discloses a method for cascading or linking vibrator sweeps together to form a cascaded sweep sequence and optionally eliminating the listen period between successive sweeps. The initial phase angle of each individual sweep segment within a sweep sequence is progressively rotated by a constant phase increment of about 360/N degrees, where N is the number of sweep segments within the sweep sequence. Either the correlation reference sequence or the vibrator sweep sequence, but not both, contains an additional sweep segment positioned and phased so as to substantially suppress harmonic ghosts during correlation. When the additional sweep segment is included at the end of the vibrator sweep sequence, it increases the total acquisition time. If the correlation reference sequence includes the additional sweep segment, it complicates the processing in that the additional sweep segment has to be input at negative time giving a nonstandard correlation operator.

In the U.S. Pat. No. 7,050,356 issued to Jeff ryes there is disclosed a method of seismic acquisition using multiple vibrators using the so-called "slip-sweep" method. The method consists of a vibrator (or a vibrator group) sweeping without waiting for the previous vibrator's sweep to terminate. Correlation, which acts as a time-frequency filter, then extracts the individual records. A significant reduction in overall acquisition time is obtained. This is more efficient than the cascaded sweep since there is no need to wait for the end of a sweep before starting the next sweep. The reduction in overall acquisition time comes at the cost of increased harmonic distortion since the harmonics from the second sweep will contaminate the primary signals of the first sweep. The patent also describes methods to estimate and remove the harmonics.

U.S. Pat. No. 6,418,079 issued to Fleure discloses a method for segmenting the spectral distribution of overlapped vibratory signals, thereby improving the efficiency of data acquisition while providing reduced harmonic distortion in the time zones of interest. Two identical sweep segments are used. Each sweep segment includes an earlier low frequency sweep and a later high frequency sweep, the individual sweeps having substantially no overlap in frequency except for tapering. The high frequency sweep in each pair starts before the end of the low frequency sweep with an overlap in time that is selected to avoid harmonics from the low frequency sweep. Correlation of the recorded signal separately with the low frequency sweep and the high frequency sweep gives data sets in which individual portions of the desired data are recoverable with the harmonic distortion largely separated from the desired data.

Another prior art way of seeking to overcome the problems resulting from the various constraints on land or marine vibrator operation is disclosed in U.S. Pat. No. 6,181,646 issued to Bouyoucos and Hollinger. The vibrator source of the system (hereinafter referred to as the prior art system) described in that patent is driven so as to provide a composite sweep, in which a high frequency sweep and a low frequency sweep are carried out concurrently over the same time interval, i.e., both sweeps start at the same time and finish at the same time.

In the UK patent application GB-2416033-A of Jeffryes and Martin, a method is described to provide a composite sweep with a low and high frequency part.

Another method to provide a composite sweep for marine vibrators is described in the U.S. Pat. No. 6,942,059 B2 issued to Smith. The desired vibroseis bandwidth is apportioned over a plurality of vibroseis projectors (sources).

E. Rietsch describes in: "Vibroseis signals with prescribed power spectrum", Geophysical prospecting, vol 25, 1977, pages 613-620, basic methods to control vibrators for generating a desired power spectrum.

In the published US patent application 2007/0133354 A1 of Bagaini there is disclosed a method, herein referred to as maximum displacement sweep design, to enhance the low frequency content of Vibroseis acquisitions using sweeps designed to optimally use the vibrator's mechanical specifications.

In view of the work on composite sweeps of high and low frequency part, it is observed that the composite signal often contains artifacts which can distort the observed vibroseis data. The present invention therefore seeks to provide novel methods of generating a composite sweep using two or more concurrently operated vibrators.

SUMMARY OF THE INVENTION

The present invention provides methods and apparatus for generating acoustic signals for use in a vibratory seismic survey, whereby at least two different sweep signals are generated for the control of at least two different vibrators; and the sweep signals are designed such that the phases and preferably the phases and amplitudes of the different sweep signals are matched at a transition frequency from one sweep signal to another.

Using the method different vibrators or groups of different vibrators can be controlled such that each vibrator receives a control signal designed to optimize the signal generated and injected into the ground. Thus vibrators designed to perform well in a lower frequency range receive a different sweep signal than vibrators designed for a higher frequency ranges. Typically the lower frequency sweep is within a frequency range from about 1 Hz to about 12 Hz and the higher frequency sweep is within a frequency range from about 8 Hz to about 100 Hz. However the exact ranges chosen depend very much on the specification and properties of the vibrators used and other design choices.

Whilst similar methods have been proposed in the prior art as described above, the current methods and apparatus in accordance with the present invention avoids the distortions of the generated signal at the overlap frequencies which are characteristic of older methods and which have prevented so far the use of combined vibrator fleets.

In order to ensure that phases and/or amplitudes of the different sweep signals match, these signals are preferably determined as parts of one single sweep which is split at the frequency or frequencies. The single sweep is designed using mechanical and/or hydraulic properties of the different vibrators or using experimentally determined functions of the maximum ground force as function of frequency. The duration of the single sweep signal is at least as long as the sum of the durations of the different sweep signals. More preferable the duration of the single sweep signal is the sum of the duration of the different sweep signal used and covers the entire frequency range of those different sweep signals combined. Most preferably the duration of the different sweep signals is equal and hence the duration of the one intermediate sweep signal is this duration times the number of different signals required. Usually one type of vibrator uses one sweep signal, hence the number of different sweep signals equals the number of different type of vibrators used in a survey.

In a preferred embodiment, the sweep signals have equal duration and are supplied to the respective vibrators at the same time.

In another preferred embodiment, the different sweep signals are tapered at a frequency where the different sweep signals overlap. To compensate for such a taper it is preferred to enhance or boost the desired power or energy spectral density in the frequency range of the taper.

The above methods and apparatus are best used for exploring the earth interior, by converting into an representation of the earth interior the signals derived from registering vibratory seismic signals acquired using at least two different sweep signals for the control of at least two different vibrators and matching the phases of the different sweep signals at a transition frequency from one sweep signal to another.

The method described herein uses two or more vibrators, which constitute a fleet, to further extend the emitted seismic bandwidth. These vibrators, which have different specifications, will be used to generate the seismic frequencies only in the range where they are more effective and introduce less distortion at the rated driving force. The heterogeneous fleet is typically composed of at least one very low-frequency (down to 2 Hz) vibrator that can be driven at a lower force than the standard vibrators that also compose the fleet.

This method, which extends the maximum displacement sweep design methodology described in the application 2007/0133354 has the advantage of not suffering from two problems of the composite sweep, i.e.:

the standard sweep must be driven with reduced force to accommodate the overlapping low frequency sweep;

the phases of the two sweep at the overlapping frequencies are such that destructive interference occurs between standard and low frequency sweep, yielding therefore notches in the power spectrum.

The novel method is capable of producing the total desired seismic bandwidth without sharp transition at the frequencies where the emission of two different vibrators overlap.

The invention will now be described, by way of non-limitative example only, with reference to the accompanying drawings.

EXAMPLES

Figure 1A:
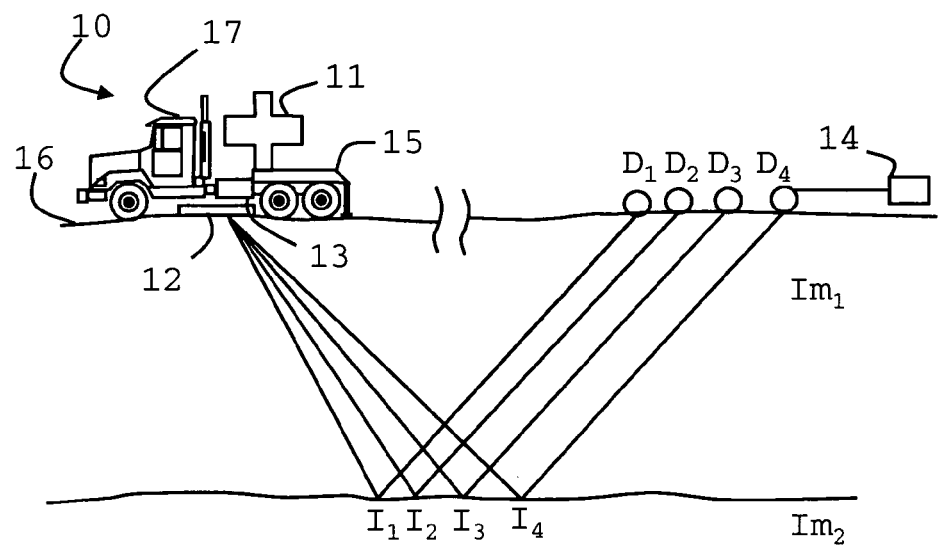
FIG. 1A is a diagram illustrating elements of a conventional vibroseis seismic survey.

The system of FIG. 1A illustrates in a simplified manner the elements of a vibroseis acquisition system, such as may be used in embodiments of the present invention. In the illustrated system, a seismic vibrator 10 comprises a vibrating element 11, a baseplate 12 and a signal measuring apparatus 13, for example a plurality of accelerometers whose signals are combined to measure the actual ground-force signal applied to the earth by the seismic vibrator. The seismic vibrator 10 illustrated in FIG. 1 is constructed on a truck 17 that provides for maneuverability of the system. As illustrated, the vibrating element 11 is coupled with the baseplate 12 to provide for the transmission of vibrations from the vibrating element 11 to the baseplate 12. The baseplate 12 is positioned in contact with an earth surface 16 and because the baseplate 12 is coupled with the strikeplate 15, the vibrations of the vibrator 11 are communicated into the earth surface 16.

The seismic signal that is generated by the vibrating element 11 and emitted into the earth, via the baseplate 12, may be reflected off the interface between subsurface impedances Im1 and Im2 at points I1, I2, I3, and I4. This reflected signal is detected by geophones D1, D2, D3, and D4, respectively. The signals generated by the vibrating element 11 on the truck 10 are also transmitted to a data storage 14 for combination with raw seismic data received from geophones D1, D2, D3, and D4 to provide for processing of the raw seismic data. In operation a control signal, referred to also as pilot sweep, causes the vibrating element 11 to exert a variable pressure on the baseplate 12.

In accordance with an example of the present invention, two vibrators are used. Whilst both vibrators 10-1, 10-2 can be essentially identical, it is advantageous to use vibrators with different specifications and hence different mechanical constraints. For the purpose of this example it is assumed that vibrator 10-1 is better adapted to generate low frequencies than vibrator 10-2. Both vibrators have different mechanical and hydraulic specifications.

To implement the example, a method of designing a sweep based on the mechanical and hydraulic specifications of the vibrators 10-1 and 10-2 is applied. The preferred method to design such sweeps is above-mentioned maximum displacement sweep design, is described below. Further details of this method can be found for example in the US patent application 2007/0133354 A1. The maximum displacement sweep design uses models of the vibrators such as the following models of FIGS. 2A and 2B.

Figure 2A:
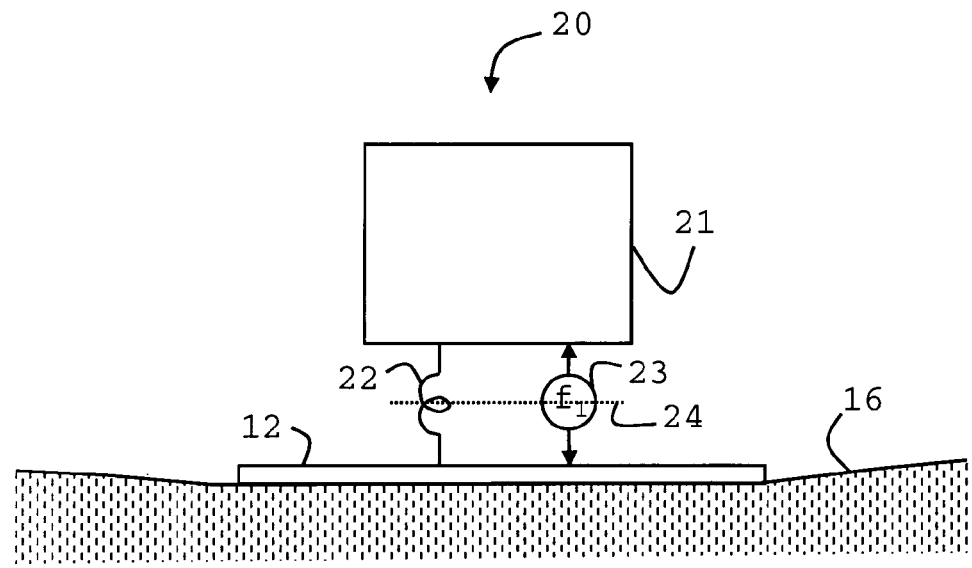
FIGS. 2A and 2B illustrated different known mechanical models of seismic vibrators, such as may be used in embodiments of the present invention.

FIG. 2A is a mechanical model of a simple seismic vibrator, such as may be used in embodiments of the present invention, illustrating major components of a seismic vibrator and driving and reactionary type forces between the depicted components. As illustrated, a seismic vibrator 20 comprises a reaction mass 21 coupled with the baseplate 12 that is in contact with the earth surface 16. A driving force f1 23 is applied to the reaction mass 21 by a driving mechanism (not shown). The flexible support 22 can be used to model the compliance of the reaction mass 21 in a neutral position 24. The flexible support mechanism 22 may be a mechanism that both supports the reaction mass 21 and provides for displacement of the reaction mass 21 about the neutral position 24. Merely by way of example, the flexible support mechanism 22 may be a spring, a coil, a hydraulic support and/or the like. In some embodiments, the flexible support mechanism 22 may not be included and the reaction mass 21 may be directly driven into a periodic-type motion about the neutral position by a driving mechanism.

Figure 1B:
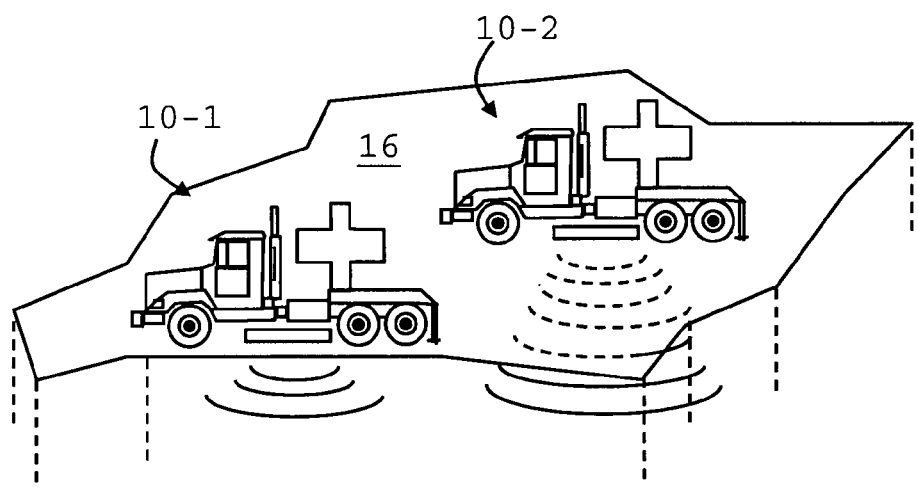
FIG. 1B is a variant of a vibroseis seismic survey, such as may be used in embodiments of the present invention.
Figure 2B:
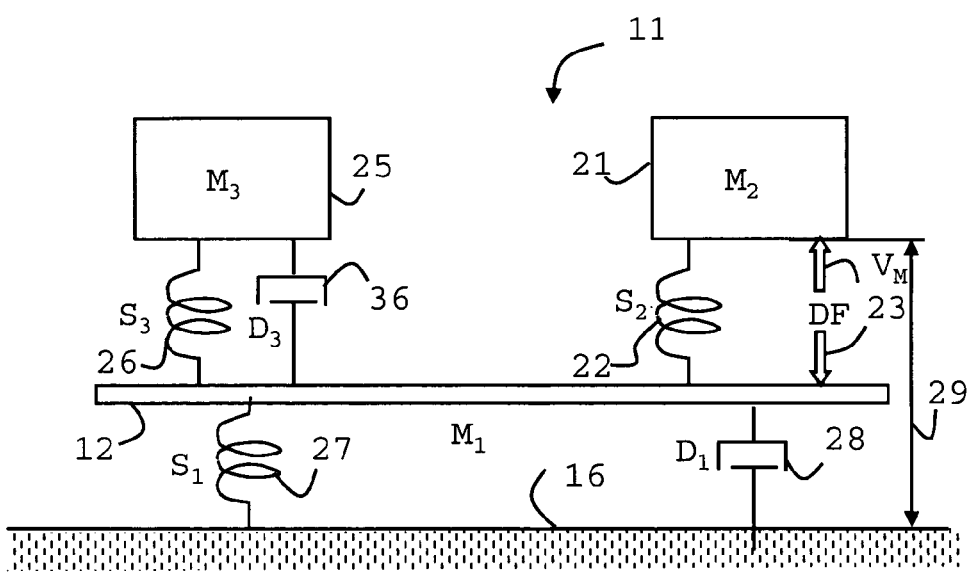

FIG. 2B is a mechanical model of a seismic vibrator with a hold down mass, such as may be used in embodiments of the present invention, illustrating major components of the seismic vibrator and driving and reactionary type forces between the depicted components and at the contact between the seismic vibrator and the earth surface. In certain embodiments of the present invention, the reaction mass 21 may be supported by the flexible support mechanism 22 and the driving force 23 may be applied to the reaction mass 21 by a driving mechanism (not shown) that may cause the reaction mass 21 to vibrate. In an embodiment of the present invention, when the driving force 23 is applied to the reaction mass 21, the sum of the forces acting on the base plate 12 may be directed downward and, therefore, the baseplate 12 may apply a positive pressure on the earth surface 16 provided the acceleration of the reaction mass 21 does not exceed gravity. However, during operation of the seismic vibrator 11, the driving force 23 may be such that acceleration of the reaction mass 21 may be about 3 or 4 times gravity. As such, a hold-down weight 25 may be used to hold the baseplate 12 in contact with the ground during operation of the seismic vibrator 11. In an embodiment of the present invention such as depicted in FIG. 1, the weight of the truck 17 may act to hold the baseplate 12 in contact with the earth surface 16.

In certain embodiments of the present invention, an isolation mechanism 26 may be used to couple the hold-down weight 25 to the baseplate 12. The isolation mechanism 26 may provide for coupling the hold-down weight 25 to the baseplate 12 and also provide for isolating and/or damping, at least in part, the baseplate 12 from the hold-down weight 25. Isolation and/or damping of the hold-down weight 25 from the baseplate 12 may serve to prevent any motion of the hold-down weight 25 causing interference with the vibration of the baseplate 16 generated by the motion of the reaction mass 21. The isolation mechanism 26 may be a spring type structure, flexible connector and/or the like. Due to the flexible support mechanism 22 and the isolation mechanism 26, there are connections between the baseplate 12 and both the reaction mass 21 and the hold-down weight 25 that may provide for transmission of vibrations between the three components.

An isolation dashpot 36 is shown in FIG. 2B to depict damping and frictional losses that may occur between the coupling, the isolation mechanism 26, of the baseplate 12 and the hold-down weight 25. Similarly, an earth-surface-reaction spring 27 and an earth-surface-reaction dashpot 28 are shown in FIG. 2B to depict the reaction of the earth surface 16 to the motion of the baseplate 16. The earth-surface-reaction spring 27 and the earth-surface-reaction dashpot 28 represent the impedance of the earth surface to the motion of the baseplate 16, where the impedance may depend upon the elasticity and other physical properties of the earth surface 16. In FIG. 2B, Vm 29 represents the velocity of the reaction mass 21 resulting from application of the driving force 23 to the reaction mass 21.

In the US patent application 2007/0133354 A1 it is further described to derive a modeling function for a particular seismic vibrator from which a value can be determined of the minimum frequency at which the maximum fundamental force, also called maximum driving force, can be delivered without exceeding the reaction mass maximum displacement. This maximum driving force, which depends on the design of the seismic vibrator and to a much lesser extent on the ground conditions, can also be experimentally determined.

Displacement of the reaction mass 21 may be measured from a location where the reaction mass 21 is at rest, may be measured from the neutral position 24 or may be measured from a position where the reaction mass 21 is at its closest proximity to the baseplate 12. The modeling function may be used to derive a model for the reaction mass displacement as a function of frequency and provide for a determination of the sweep phase and driving force at low frequencies that permits the transmission of maximum energy into the ground given the mechanical constraints of the seismic vibrator.

For purposes of modeling the seismic vibrator, $f_{md}$ may be used to represent the minimum frequency at which the maximum driving force (DF) can be used without exceeding the reaction mass maximum displacement. As such, in certain embodiments, the driving force used to avoid exceeding the maximum stroke that may be applied to the reaction mass 21 at frequencies lower than $f_{md}$ may be approximated by:

$$DF(f) = DF(f_{md})\frac{f^2}{f_{md}^2} \text{ for } f \leq f_{md} \qquad (1)$$
$$= DF(f_{md}) \text{ for } f > f_{md}.$$

where equation (1) may be derived from the equivalent electrical circuit of the basic vibrator.

Equation (1), or the experimentally determined drive force, may thus be used to design the low-frequency end of the sweep for a given actuator power spectral density (psd(f)). It may be noted, however, that the ground-force and the power spectral density actually put into the ground may be exactly derived only if the properties of the soil/earth on which the seismic vibrator is located are known. The necessary sweep rate SR(f) to obtain esd(f) may be determined according to the following equation:

$$SR(f) = 4\frac{esd(f)}{DF^2(f)} [\text{s/Hz}]. \qquad (2)$$

The time at which the instantaneous frequency $f_i$ is put into the ground may be determined according to the following:

$$t_i(f_i) = \int_{f_{min}}^{f_i} SR(f) df \qquad (3)$$

where $f_{min}$ is the minimum frequency of interest and $t_i(f_i)$ is a monotonic function of $f_i$ that may be numerically inverted to obtain the time dependent instantaneous frequency put into the ground $\hat{f}_i(t)$. Finally, the sweep amplitudes may be represented by the following:

$$a(t)=DF(\hat{f}_i(t))\sin(2\pi\int_0^t\hat{f}_i(t)dt+\alpha), \qquad (4)$$

where $\alpha$ is a user defined initial phase.

Based on the method as outlined above, a single sweep is designed whose length is M times the sweep length, M being the number of vibrators operated to generate the composite sweep. The desired power spectral density (psd) of the ground force and the sweep length (L) are input parameters. A frequency dependent driving force profile is designed according to the maximum force at which each vibrator of the fleet can be driven. For the example of FIG. 1B, the number M of vibrators which make up the fleet equals 2.

Although the method is described using the example of FIG. 1B, in which two vibrators constitute the fleet, the method is not limited to two vibrators and can also be used with three, five, ten or more vibrators. In the example, vibrator 10-1 is the low frequency vibrator, which is assumed to be designed to emit a maximum target fundamental force which is 25% of that of vibrator 10-2. If the desired psd is flat throughout the bandwidth, ¹⁄₁₆ of the bandwidth will be allocated to vibrator 10-1 and the remaining ¹⁵⁄₁₆ to vibrator 10-2. In general, in the case of two vibrators, the ratio of the bands emitted by the first and the second vibrator would be:

$$\frac{B_1}{B_2} = \left(\frac{F_1}{F_2}\right)^2, \qquad (5)$$

where F1 and F2 are the maximum target fundamental forces obtainable with vibrator 10-1 and 10-2 respectively. If the desired psd is not flat in the desired bandwidth, the ratio B1/B2 is computed in such a way that the two vibrators will sweep for the same length.

According to the example, a single sweep (concatenated sweep) of length L*M is designed using the Maximum Displacement approach as described above. The force profile to design the concatenated sweep will take into account the maximum target fundamental force of each vibrator in the fleet and the vibrator displacement limit frequencies. In the following M=2 and a sweep length of 12 s is used to illustrate the disclosed method, but the invention is not limited to this case. The concatenated sweep is designed with a desired energy spectral density flat from 2.2 Hz to 80 Hz.

Figure 3A:
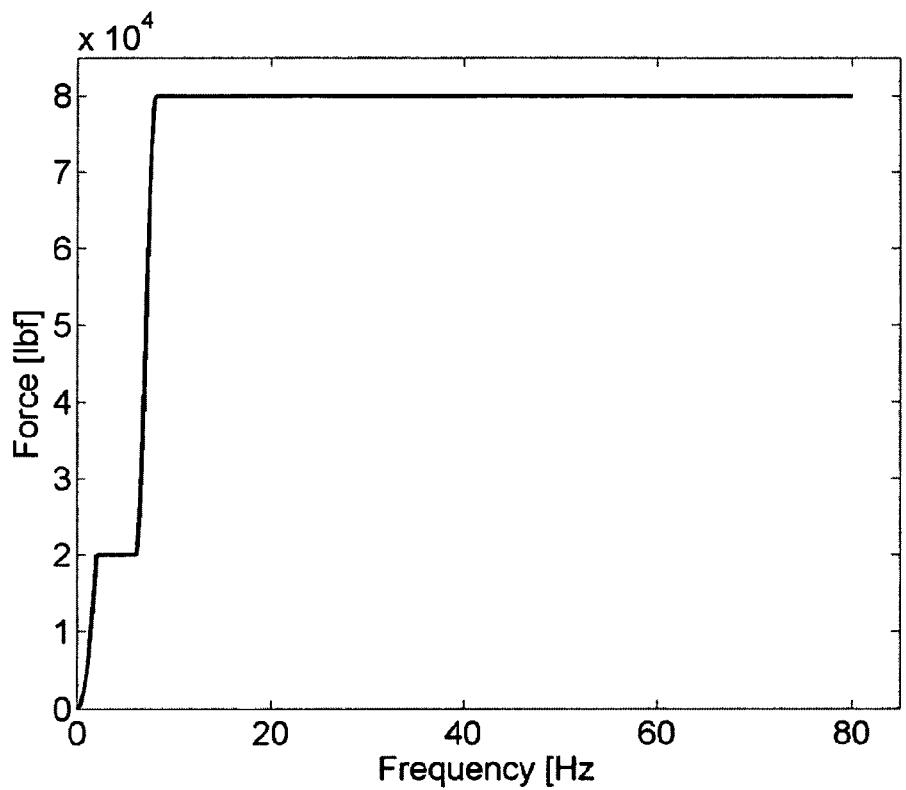
FIGS. 3A and 3B shows the force profile of a concatenated sweep for 2 different vibrators and an enlarged section thereof.
Figure 3B:
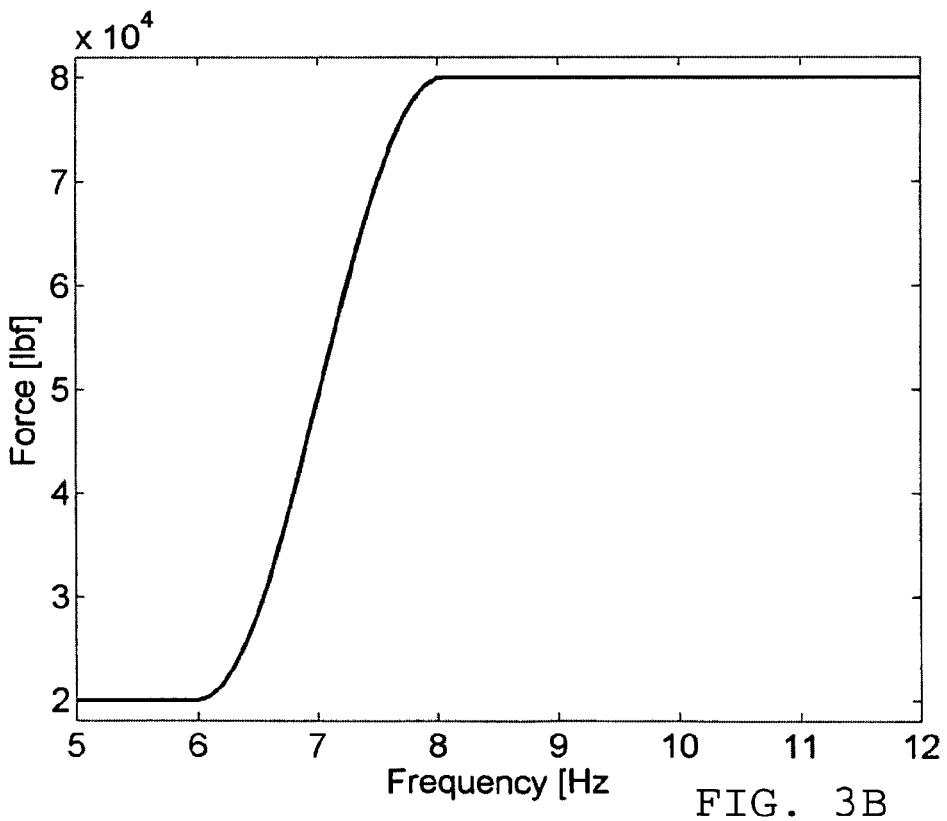

FIG. 3A shows the force profile of a concatenated sweep for 2 vibrators having a ratio of their target fundamental forces $F_1/F_2=0.25$. The step from the maximum force plateau of vibrator 10-1 to vibrator 10-2 is shown in the enlarged section (FIG. 3B). The frequency transition from vibrator 10-1 to vibrator 10-2 happens within the transition frequency band between 5 Hz and 8 Hz.

Figure 4A:
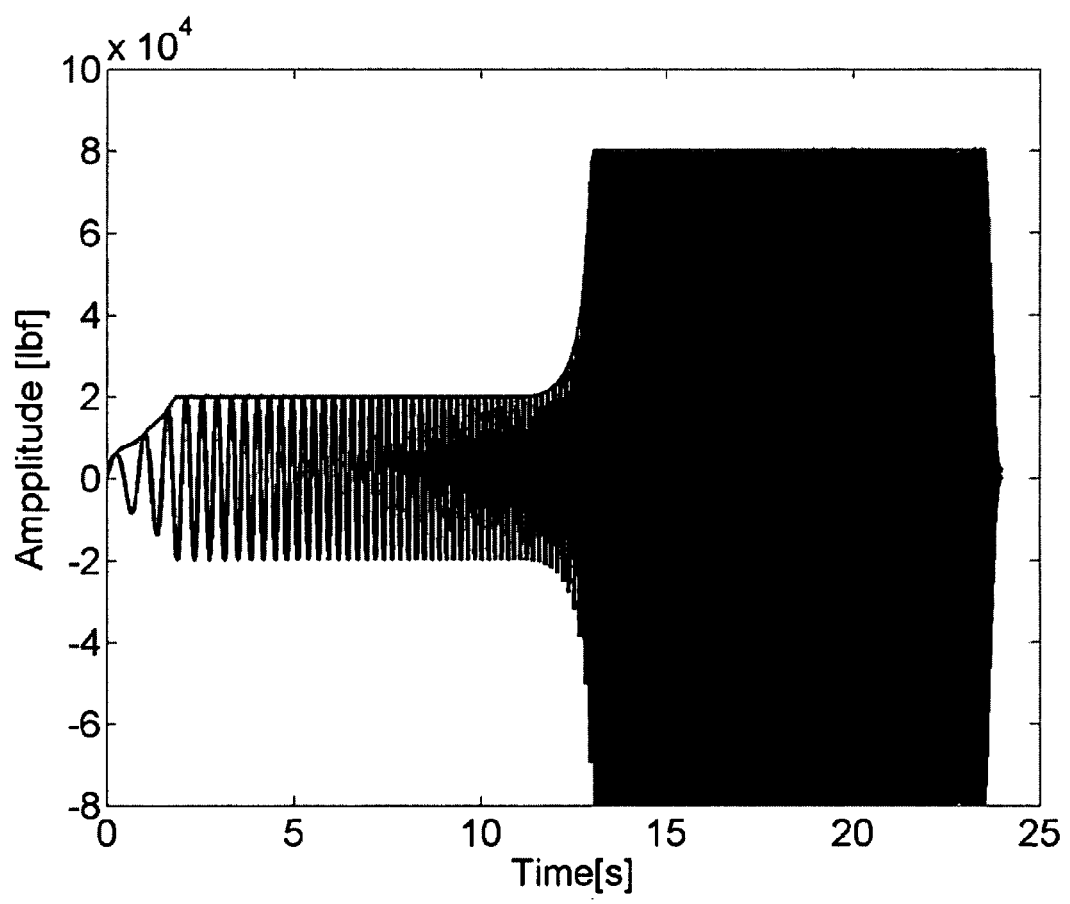
FIGS. 4A and 4B show a concatenated sweep signal for 2 different vibrators.
Figure 4B:
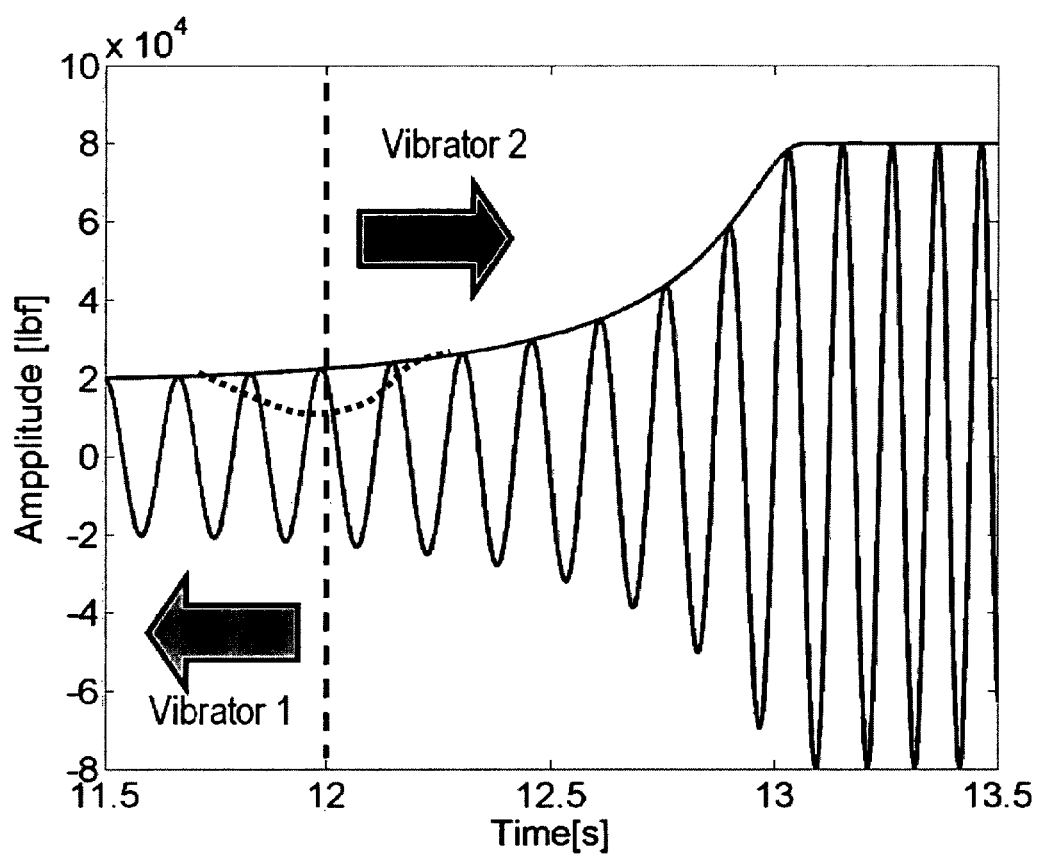
Figure 4C:
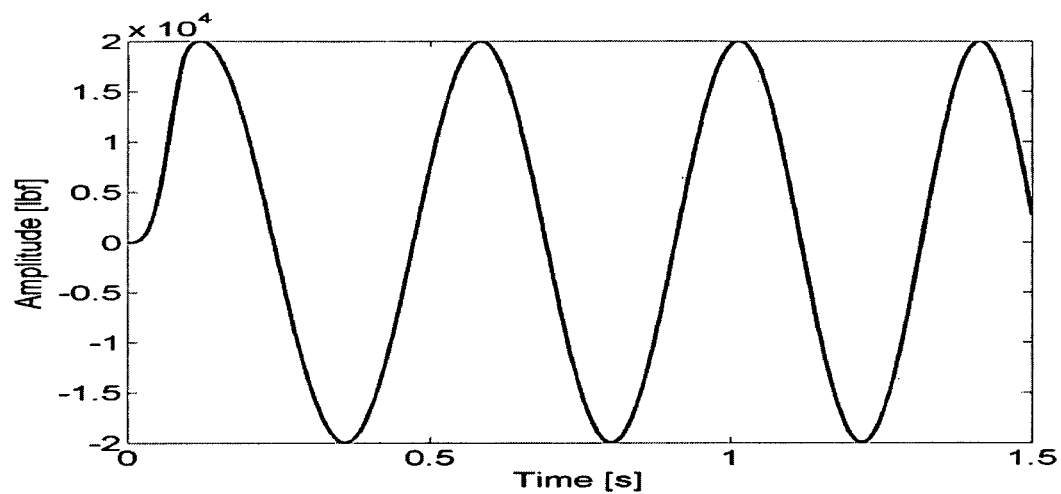
FIG. 4C shows two different sweep signal derived from the concatenated sweep signal of FIGS. 4A and 4B.
Figure 4C:
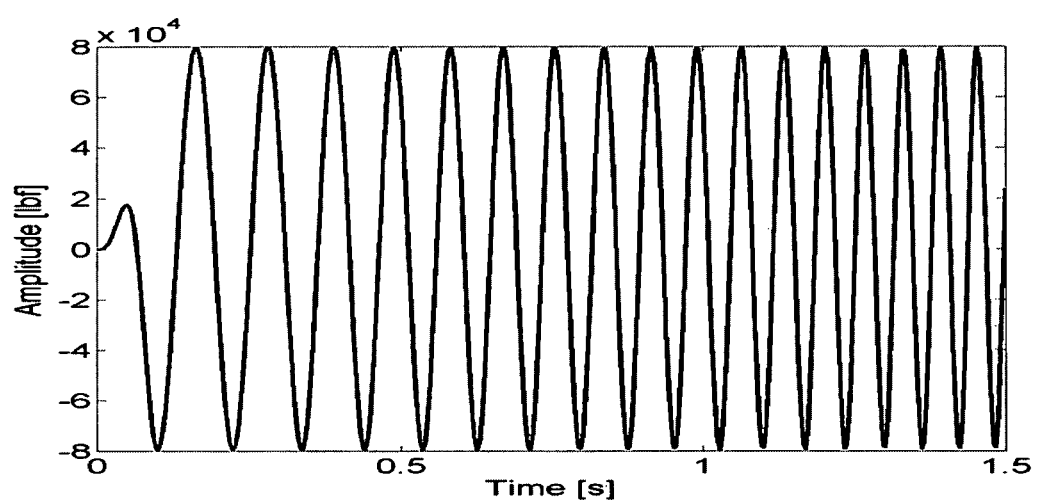

The sweep signal corresponding to this force profile and determined using the method described above is shown in FIG. 4A together with its amplitude envelope. The full signal is 24 s long. An enlarged section of this signal around the transition time of 12 s is shown in FIG. 4B. This transition time point marked by a dashed line is the point where the calculated signal is to be split to form two separate sweep signals of 12 s length each. These respective signals as shown in FIG. 4C are then used as the sweeps signals for each of the vibrators. As these signals are originally designed as a single sweep signal, they match in phase and amplitude at the split point.

In some cases it can be advantageous to add a short taper at the sweep transitions without substantially changing the spectrum. Such a taper changes the sweep as indicated by the variation of the envelope shown as dotted line in FIG. 4B (and would lead to corresponding change in FIGS. 3A and 3B, which change is however not shown in those plots).

Figure 5:
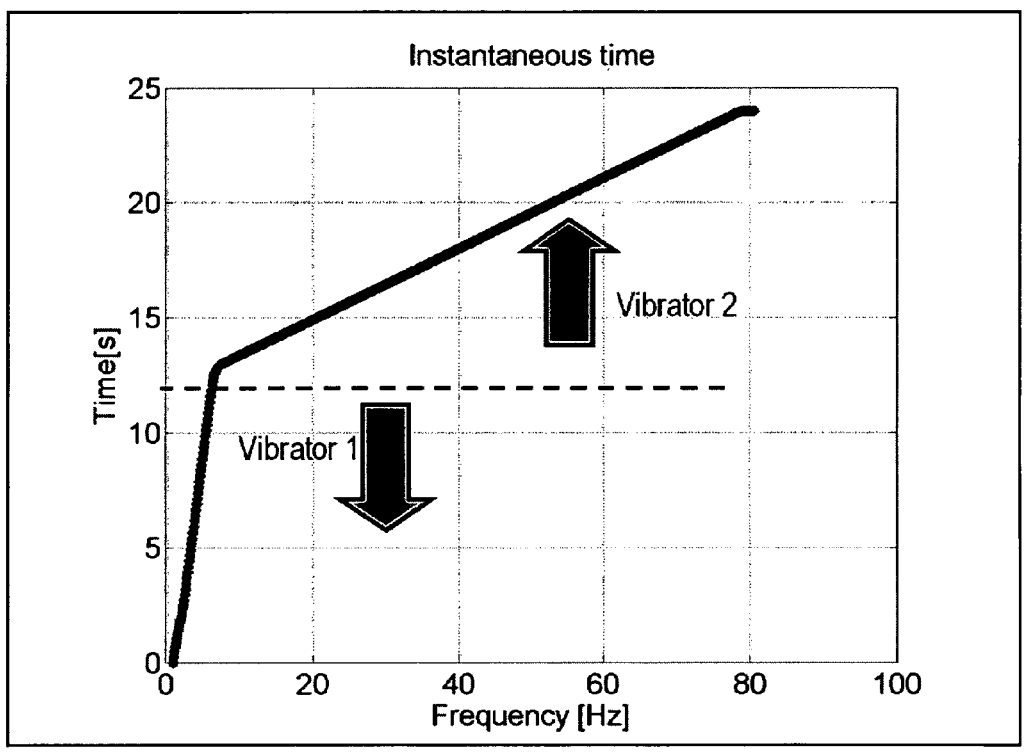
FIG. 5 is a time versus frequency plot of the concatenated sweep signal of FIGS. 4A and 4B.

The instantaneous time function versus frequency $t_i(f_i)$ version of the concatenated sweep determined using equation (3) above is shown in FIG. 5. Again, the signals for each vibrator are separated in both plots by a dashed line.

Figure 6A:
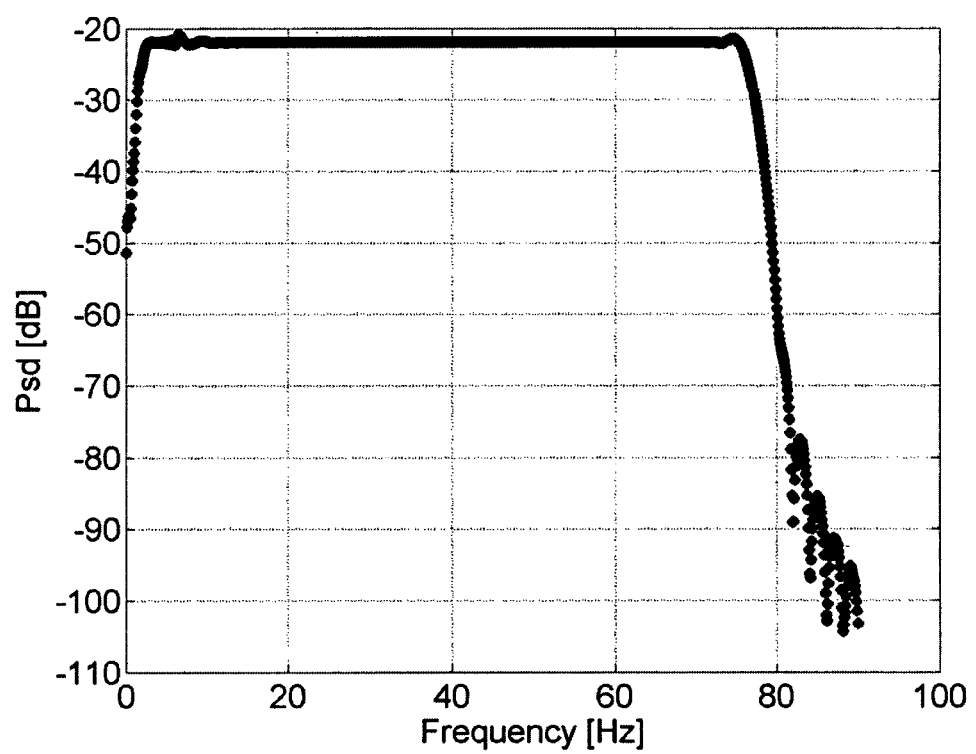
FIGS. 6A and 6B show a power spectrum of an example in accordance with the present invention.
Figure 6B:
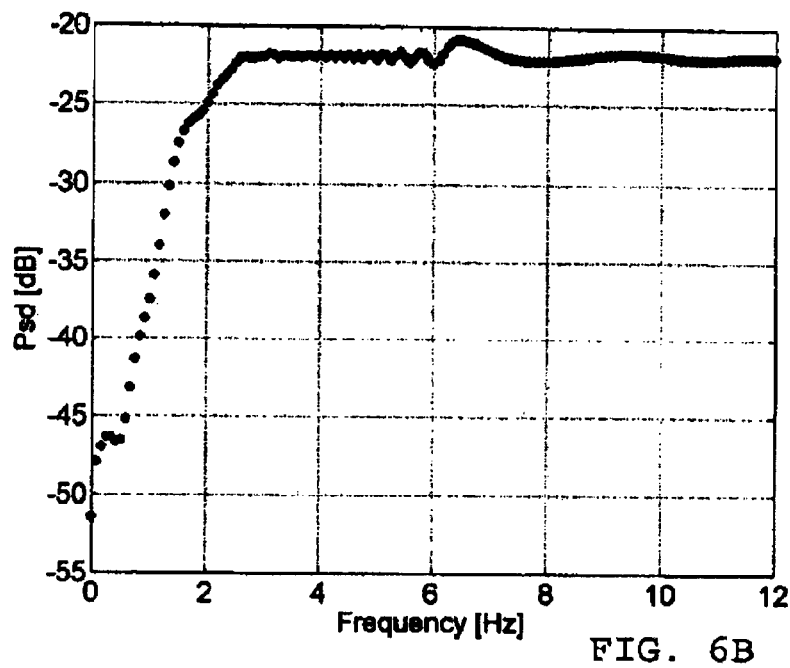
Figure 6C:
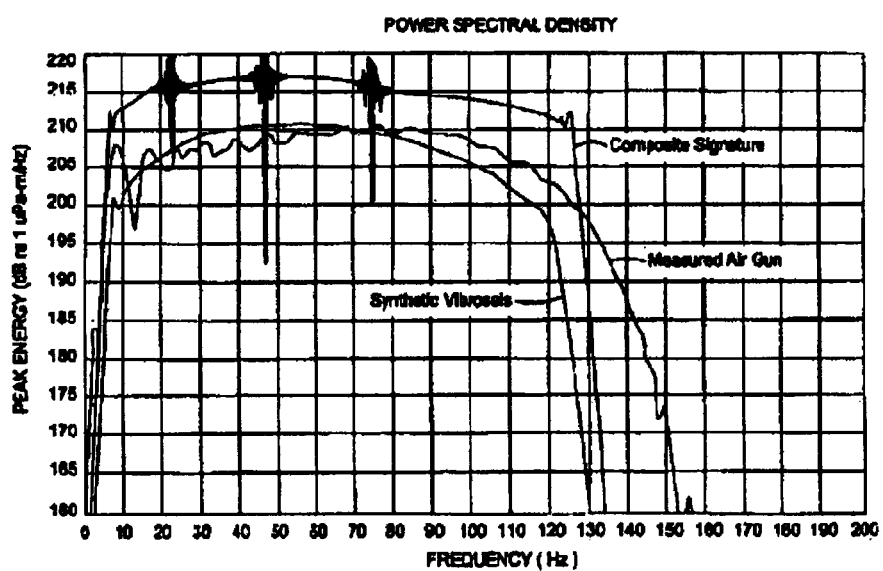
FIG. 6C (prior art) provides a plot derived from a known method for comparison with FIG. 6B above.

The energy spectral density of the concatenated sweep, which is identical to the sum of the energy spectral densities of the sweeps allocated to the individual vibrators, is shown in FIGS. 6A and 6B. FIG. 6B is an enlarged section of FIG. 6A centered on the transition frequency band. It is now important to note that because of the properties of the discrete Fourier transform, the Fourier transform of the sequence obtained by wrapping the concatenated sweep at half its sweep length is identical to the discrete Fourier transform of the concatenated sweep sub-sampled by a factor 2. In other words, the sum of the discrete Fourier transforms of the two sweeps that drive the two vibrators coincide with the discrete Fourier transform of the concatenated sweep sub-sampled of a factor 2.

To compare methods in accordance with the present invention with previously known method, a prior art FIG. 6B is reproduced from U.S. Pat. No. 6,942,059 for comparison with the similar FIG. 6b of the invention. The prior art FIG. 6B shows very pronounced distortions at 23, 46 and 75 Hz frequencies. It is believed that by matching phase and amplitude of the sweep signal at the transition point as taught by the present invention such distortions are avoided. The present invention is capable of generating a much smother power spectrum as shown in the similar FIG. 6B of the invention.

Figure 7:
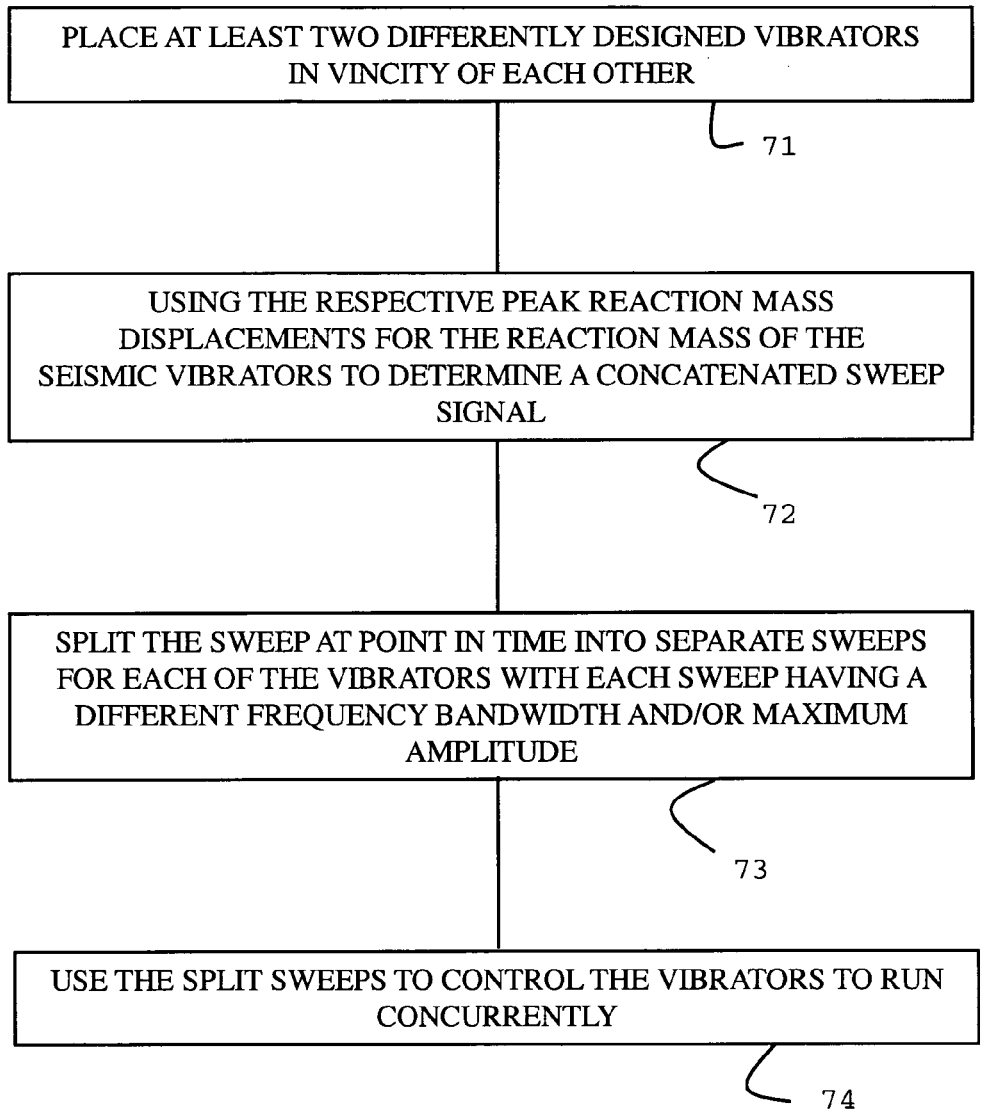
FIG. 7 is a flowchart of steps in accordance with an example of the present method.

The flow chart of FIG. 7 lists steps in accordance with the above example of the invention. It includes the step 71 of co-locating as close as possible at least two vibrators. The vibrators are optimized to wave energy into the earth in different frequency bands. Given the specifications of each type of vibrator a sweep signal is derived of a duration directly proportional to the number of different vibrators in step 72. The duration is usually the desired sweep duration times the number of different vibrators. In step 73 the concatenated sweep signal is split into sweep signals for the different vibrators. In the above example the sweep duration for each vibrator is equal. This process ensures that the sweep signals are matched in amplitude and phase at the transition frequency, though having in general different amplitudes and bandwidth. The split signals can then be fed as control signals to the respective vibrator (Step 74). If, as above, the signals have equal length, it is seen as the most efficient way of applying the new method by starting and ending the sweeps of each type of vibrator at the same time.

Moreover, it has been found that the frequencies emitted by the low-frequency vibrator are usually such that the separation $\Delta s$ between the low-frequency vibrator and the other vibrator(s) can be ignored at the propagating wavelengths and angles of incidence of the seismic events. In other words, the moveout at the receiver is such that the two or more vibrators that constitute the fleet can be considered a single point-source.

The harmonic noise generated by the low-amplitude low-frequency vibrator can be attenuated using for example the method disclosed in U.S. Pat. No. 7,050,356 B2.

Although the invention has been described in relation to hydraulically operated seismic vibrators, those skilled in the art will appreciate that it is also applicable to electromagnetically operated seismic vibrators. It is also applicable to marine type vibrators.

The invention claimed is:

1. A method of generating acoustic signals for use in a vibratory seismic survey, comprising:
    generating at least two different sweep signals for the control of at least two different vibrators;
    using the at least two different sweep signals in a single sweep having a duration longer than the duration of each of the at least two different sweep signals and proportional to the number of vibrators; and
    matching the phases of the different sweep signals at a transition frequency from one sweep signal to another.

2. The method of claim 1, comprising matching the phases and amplitudes of the different sweep signals at the transition frequency from one sweep signal to another.

3. The method of claim 2, wherein the different sweep signal have a different frequency range.

4. The method of claim 3, wherein a first of the different sweeps is a lower frequency sweep and a second of the different sweeps is a higher frequency sweep.

5. The method of claim 3, wherein a first of the different sweeps is a lower frequency sweep with a frequency range from about 1 Hz to about 12 Hz and a second of the different sweeps is a higher frequency sweep with a frequency range from about 8 Hz to about 100 Hz.

6. The method of claim 1, wherein the different sweeps are generated from a concatenated sweep signal of a length of at least the combined length of the different sweeps.

7. The method of claim 6, comprising determining a single sweep signal using mechanical and/or hydraulic properties of the different vibrators, wherein the duration of the single sweep signal is at least as long as the sum of the durations of the different sweep signals.

8. The method of claim 7, comprising determining a single sweep signal using experimentally determined functions of a maximum ground force as function of frequency for each of the vibrators used.

9. The method of claim 1, wherein the different sweep signals are tapered at a frequency where the different sweep signals overlap.

10. The method of claim 9, wherein a desired power spectral density is increased in a frequency range where the different sweep signals overlap.

11. A method of exploring the earth interior, comprising converting signals into a representation of the earth interior wherein the signals are derived from registering vibratory seismic signals acquired using at least two different sweep signals for the control of at least two different vibrators and matching the phases of the different sweep signals at a transition frequency from one sweep signal to another during combination of the different sweep signals in a longer duration sweep.

* * * * *